(12) United States Patent
Solomon et al.

(10) Patent No.: US 10,481,968 B2
(45) Date of Patent: Nov. 19, 2019

(54) METHOD AND SYSTEM FOR DETERMINING AND REPORTING EQUIPMENT OPERATING CONDITIONS AND HEALTH STATUS

(71) Applicant: GE Energy Power Conversion Technology Limited, Rugby, Warwickshire (GB)

(72) Inventors: Luke Solomon, Pittsburgh, PA (US); Sergio Dominguez, Rugby (GB); Michael Doucette, Pittsburgh, PA (US); Alexander Sieman, Pittsburgh, PA (US)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 51 days.

(21) Appl. No.: 15/484,732

(22) Filed: Apr. 11, 2017

(65) Prior Publication Data

US 2018/0293124 A1    Oct. 11, 2018

(51) Int. Cl.
*G06F 11/00* (2006.01)
*G06F 11/07* (2006.01)
(Continued)

(52) U.S. Cl.
CPC ........ *G06F 11/079* (2013.01); *G05B 19/0428* (2013.01); *G05B 23/0213* (2013.01);
(Continued)

(58) Field of Classification Search
CPC .............. G06F 11/079; G06F 11/0709; G06F 11/3055; G06F 11/3058; G06F 11/3065; G05B 19/0428; G05B 19/0421; G05B 23/0213; G05B 23/0235; G05B 2223/06; G05B 2219/14084; G05B 2219/24048; G05B 2219/24084
See application file for complete search history.

(56) References Cited

U.S. PATENT DOCUMENTS 5,988,986 A   11/1999 Brinken et al.
6,199,018 B1 * 3/2001 Quist .................. G01M 13/028
                                                            318/806

(Continued)

FOREIGN PATENT DOCUMENTS

EP    1 168 130 A1    1/2002

OTHER PUBLICATIONS

Extended European Search Report and Opinion issued in connection with corresponding EP Application No. 18162921.3 dated Sep. 6, 2018.

*Primary Examiner* — Joseph D Manoskey
(74) *Attorney, Agent, or Firm* — Wood IP LLC

(57) ABSTRACT

Provided is an electric machine health monitoring system that includes an electric machine, a data acquisition component, a local transmitter, a communications network, and a remote diagnostic unit that is configured to receive the time sequenced operational information, asset performance, and health status indicators from a local transmitter. The remote computational unit comprises software that is configured to perform diagnostic analysis of time sequenced operational information to determine the asset performance and health status of the electric machines.

20 Claims, 8 Drawing Sheets

(51) Int. Cl.
*G06F 11/30* (2006.01)
*G05B 19/042* (2006.01)
*G05B 23/02* (2006.01)

(52) U.S. Cl.
CPC ...... *G06F 11/0709* (2013.01); *G06F 11/3058* (2013.01); *G05B 19/0421* (2013.01); *G05B 23/0235* (2013.01); *G05B 2219/14084* (2013.01); *G05B 2219/24048* (2013.01); *G05B 2219/24084* (2013.01); *G05B 2223/06* (2018.08)

(56) References Cited

U.S. PATENT DOCUMENTS

| | | | |
|---|---|---|---|
| 9,245,116 B2 | 1/2016 | Evans et al. | |
| 2003/0046382 A1* | 3/2003 | Nick | G05B 9/02 709/224 |
| 2004/0199573 A1* | 10/2004 | Schwartz | G05B 23/0229 709/201 |
| 2013/0124469 A1 | 5/2013 | Atamna et al. | |

* cited by examiner

METHOD AND SYSTEM FOR DETERMINING AND REPORTING EQUIPMENT OPERATING CONDITIONS AND HEALTH STATUS

TECHNICAL FIELD

The present disclosure relates to diagnosing and reporting conditions and health status of industrial assets. In particular, the present disclosure relates to a system and method for determining electric machine performance and health status.

BACKGROUND

Electric machine diagnostics and monitoring is commonly performed to identify current health and performance status of an electric machine. Traditional machine health monitoring systems perform diagnostics on a local diagnostic unit. The local diagnostic unit comprises a local computational unit which receives sensor data, performs at least one local diagnostic test on the sensor data, and outputs the machine status indicator. The outputs of these systems can be sent to a customer network, or to remote experts. If machine operational data is available, the remote experts are able to determine the severity of any faults indicated and report back to a customer. This requires the experts to design the machine diagnostic algorithms, and also expert personnel to fill the remote service agreement.

In other traditional machine health monitoring systems, data acquisition is performed locally and the data is sent to a remote diagnostic unit where the health status can be determined by a machine expert. The machine expert has access to all the information about the machine. However, challenges occur when transmitting high bandwidth data to a remote server. Unfortunately, data fidelity may be lost during transmission.

SUMMARY

Given the aforementioned deficiencies, a need exists for a health monitoring system for an electric machine, including a software module for diagnostic software techniques within a remote diagnostic unit. More specifically, a need exists for a system that collects and analyzes operational data locally, and transmits the data to a remote diagnostic unit for additional diagnostic analysis.

One embodiment provides a system that includes an electric machine, a data acquisition component, a local transmitter, a communications network, and a remote diagnostic unit. The remote diagnostic unit includes a remote computational unit and is configured to receive time sequenced operational information, asset performance, and health status indicators from the local transmitter. The remote diagnostic unit can assess the health status given by the local system by executing one or more remote diagnostic tests to obtain a health status indicator, and a remote expert can compare the health status indicator with time sequenced operational data to perform expert analysis. Additionally, the remote diagnostic unit can leverage fleet diagnostics when many similar machines are connected to the remote computing unit network. Commercially, embodiments of the system perform as both a standalone system and a remote service tool.

In certain embodiments, a method using this system shall perform all diagnostic analysis on a local diagnostic unit which includes a remote computational unit and uses the high bandwidth operational data collected from a sensor to determine electric machine performance and health status by executing one or more local diagnostic tests. The local diagnostic unit transmits the status indicators, as well as time sequenced raw operational data, to a transmitter and/or communication network. The transmitter/communication network transmits indicators and data to the remote computational unit. The remote diagnostic unit performs additional machine diagnostics based on the current health status of the machine determined by the local diagnostic unit and on the operational data sent from the local diagnostic unit.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1:
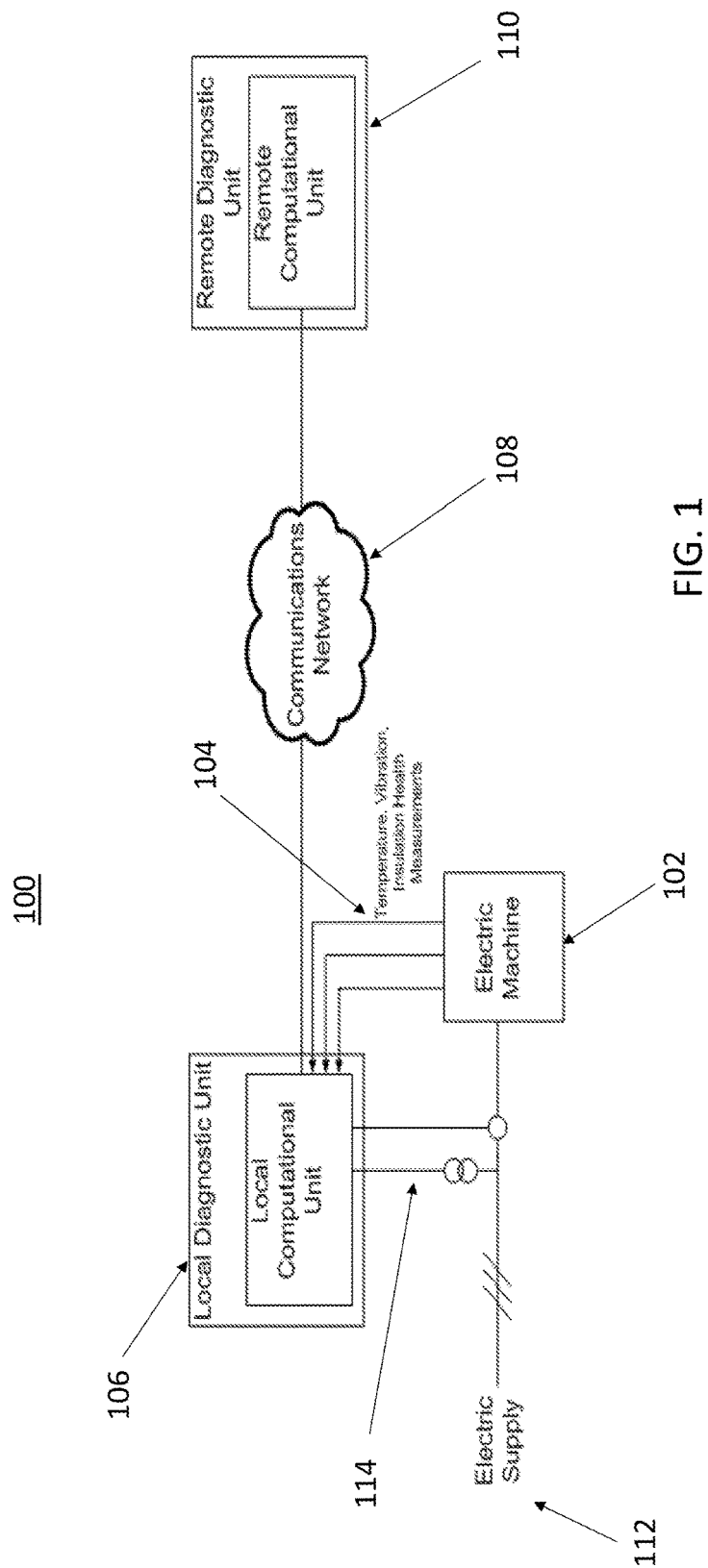
FIG. 1 is a block diagram of a health monitoring system including a remote diagnostic unit in accordance with the embodiments.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Reference will be made below in detail to exemplary embodiments of the inventive subject matter, examples of which are illustrated in the accompanying drawings. Wherever possible, the same reference numerals used throughout the drawings refer to the same or like parts.

Embodiments of the invention provide a health monitoring system including diagnostic techniques.

FIG. 1 is a block diagram of an electric machine health monitoring system 100 for an electric machine 102. The health monitoring system 100 comprises an electric supply 112 which provides power to the electric machine 102. The local diagnostics unit 106 also collects operational data of the electric supply using sensor set 114. In one particular embodiment, this operational data includes measurements of the voltage and current sent to the electric machine 102 by the electric supply 112. Operational data is transmitted from the electric machine 102 through sensor set 104 to the local diagnostic unit 106, which includes a local computational unit that is configured to receive operational data and perform at least one diagnostic test on the operational data. In one particular embodiment, the operational data measured by sensor set 104 includes one of temperature, vibration signature, and insulation integrity of the electric machine. The local diagnostic unit 106 transmits operational data and results of the diagnostic test to a communications network 108. The communications network 108 transmits the operational data and the results of the diagnostics to a remote diagnostic unit 110. The remote diagnostic unit 110 includes a remote computational unit which is configured to receive both the operational data and local diagnostic unit diagnostic test results from the local diagnostic unit 106. The remote diagnostic unit 110 is further configured to perform at least one additional diagnostic test using the operational data and local diagnostic unit diagnostic test result in order to obtain at least one electric machine health status indicator.

The diagnostic test performed by the local diagnostic unit 106 compares the electric machine operational data and/or the results of the diagnostics test performed by the local diagnostic unit 106 with historical patterns.

The diagnostic test performed by the local diagnostic unit 106 compares the electric machine operational data and/or the results of the diagnostic test performed by the local diagnostic unit 106 with predetermined thresholds.

The electric machine health status indicator generated by the remote diagnostic unit 110 compares the electric machine operational data, the results of the diagnostic test performed by the local diagnostic unit and/or the results of the diagnostic test performed by the remote diagnostic unit 110 with historical patterns.

The electric machine health status indicator generated by the remote diagnostic unit 110 compares the electrical machine operational data, the results the diagnostics test performed by the local diagnostic unit 106, and/or the results of the diagnostic test performed by the remote diagnostic unit 110 with a predetermined threshold.

Figure 2:
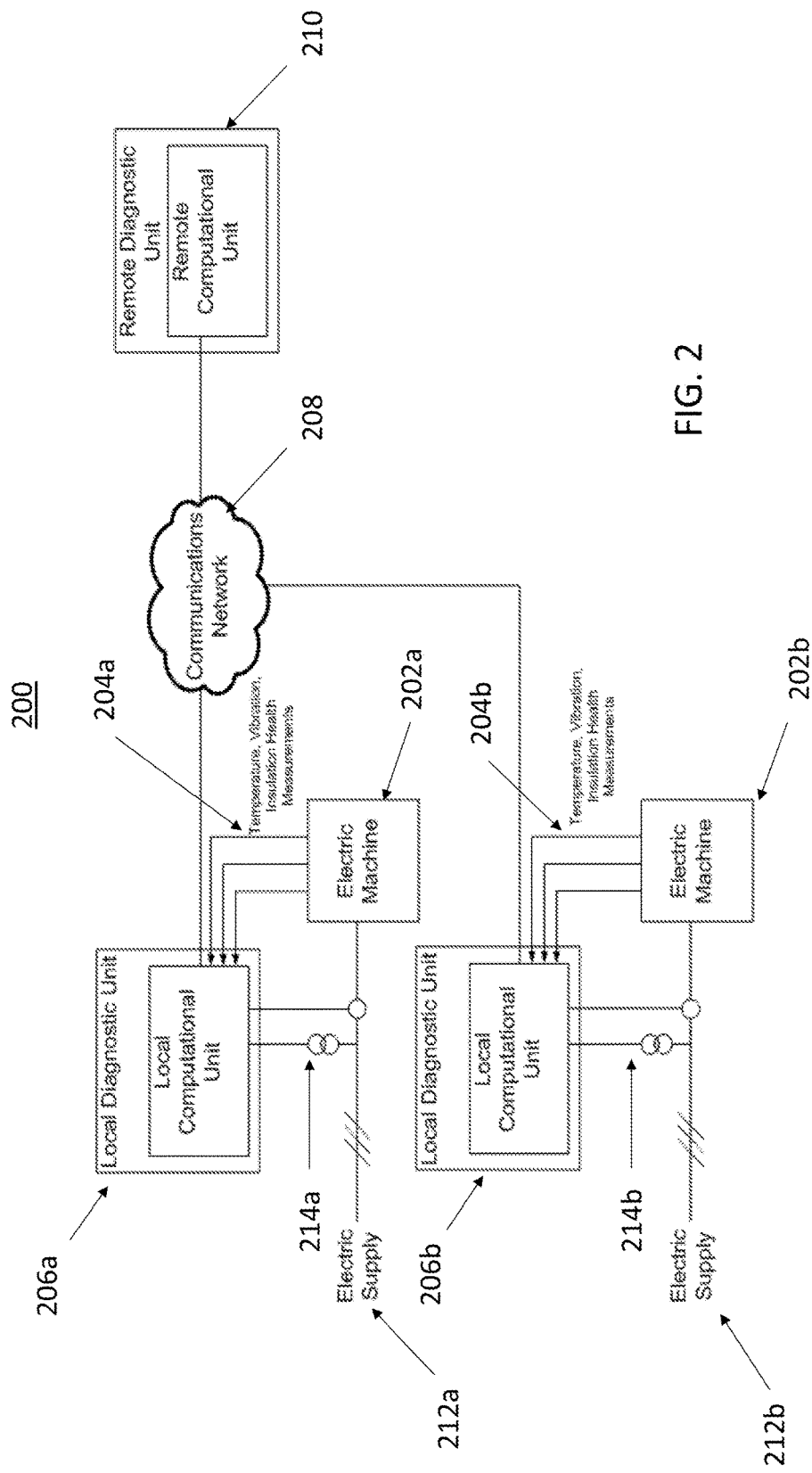
FIG. 2 is a block diagram of the health monitoring system including multiple local diagnostic units and electric machines in accordance with an embodiment of this disclosure.

FIG. 2 is a block diagram of an electric machine health monitoring system 200, wherein multiple local diagnostic units 206a and 206b are connected to a communications network 208. As illustrated in FIG. 2, electric supplies 212a and 212b are connected to electric machines 202a and 202b and local computational units 206a and 206b, respectively. Electric machines 202a and 202b transmit operational information to the local computational units 206a and 206b via transmitters 204a and 204b, respectively. In an embodiment, operational information includes, but is not limited to, temperature, vibration, and insulation health measurements. Local diagnostic units 206a and 206b collect operational data, including, but not limited to, measurements of voltage and current supplied to the electric machines 202a and 202b from electric supplies 212a and 212b, through the sensor sets 214a and 214b, respectively.

The embodiment illustrated in FIG. 2 differs from the embodiment illustrated in FIG. 1, wherein multiple local diagnostic units 206a and 206b are connected to the communications network 208. The local diagnostic units 206a and 206b both perform the same functions as the local diagnostic unit 106 in FIG. 1. The communications network 208 transmits information from each of the local diagnostic units 206a and 206b to the remote diagnostic unit 210. The remote diagnostic unit 210 generates an electric machine health status indicator for each electric machine 202a and 202b according to the information transmitted from local diagnostic units 206a and 206b, respectively.

Figure 3:
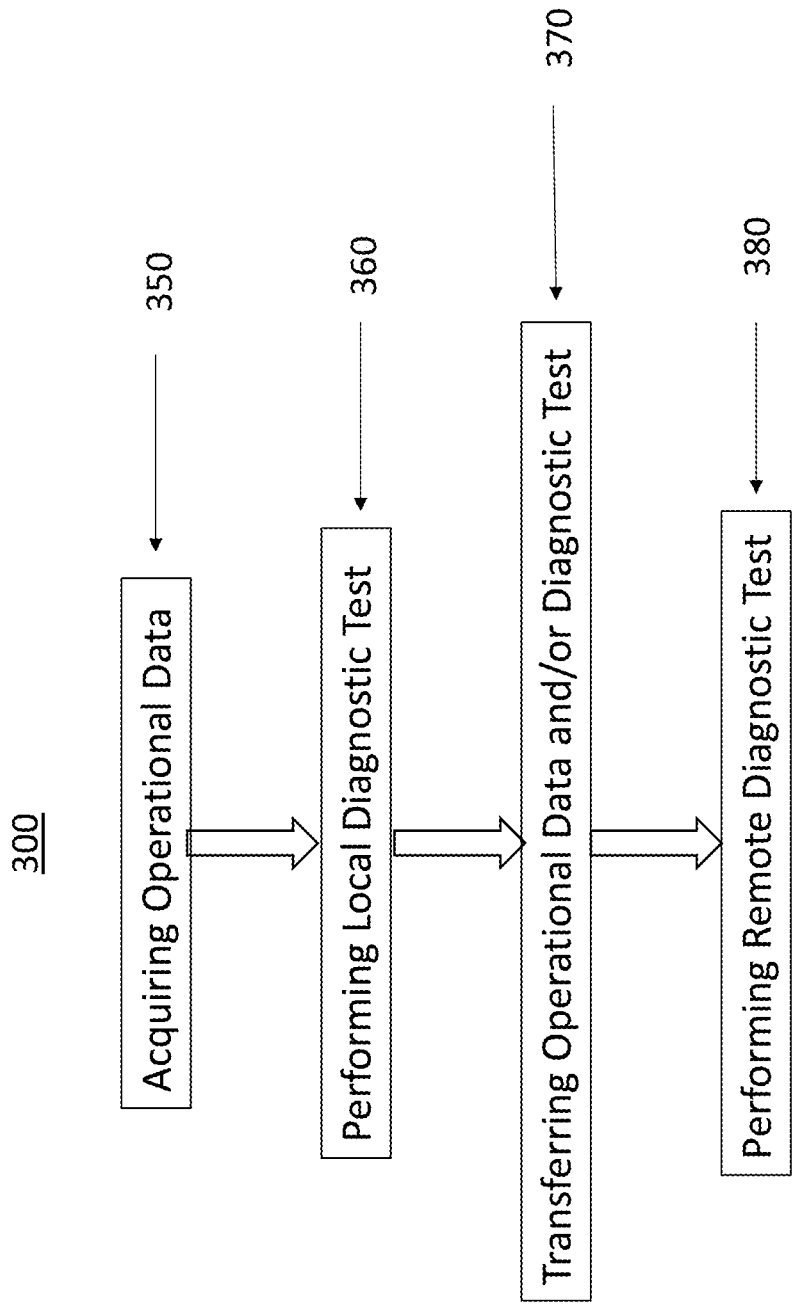
FIG. 3 is a flow diagram illustrating an exemplary method of practicing the embodiments.

A method 300 of FIG. 3 of any embodiment, for performing health monitoring and machine performance of the electric machine 102 will be discussed. The method 300 begins at acquiring 350 operational data from an electric machine 102 using a local diagnostic unit 106. From acquiring 350, the process continues to performing 360 local diagnostic test. The local diagnostic unit 106 performs a diagnostic test on the operational data. From performing 360, the process continues to transferring 370 operational data and/or diagnostic test.

The local diagnostic unit 106 transfers the operational data and/or the results of the diagnostics tests performed by the local diagnostic unit 106 to the remote computational unit 110. From transferring 370, the process continues to performing 380 remote diagnostic test. The remote diagnostic unit 110 performs a diagnostic test on the operational data and/or the diagnostic test performed by the local diagnostic unit 106.

The method 300 further comprises an electric machine expert performing a diagnostic test using the operational data from the electric machine 102, the results of the diagnostic test performed by the local diagnostic unit 106, and the results of the diagnostic test performed by the remote diagnostic unit 110.

The method 300 further comprises a calculation of health status indicator of the electric machine 102 using one or more of the results of a diagnostic test performed by the local diagnostic unit 106, the results of diagnostic test performed by the remote diagnostic unit 110, the result of the diagnostic test performed by the electric machine expert, and/or the electric machine operational data. The method further comprises reporting a health status indicator to an end user.

Figure 4:
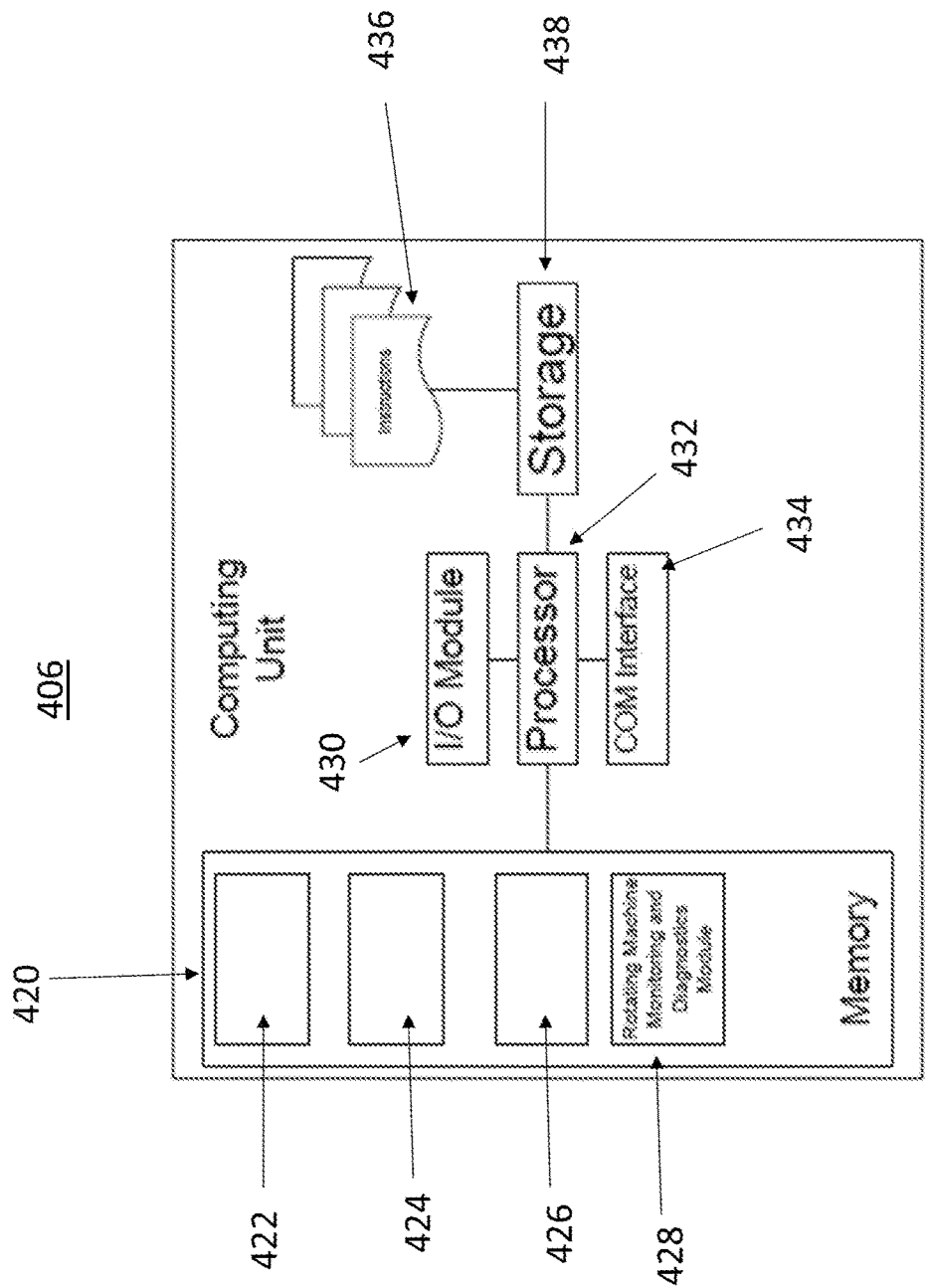
FIG. 4 is a block diagram of a local diagnostic unit.

FIG. 4 is a block diagram of a local diagnostic unit 406, which can include a processor 432 that has a specific structure. The specific structure is imparted to the processor 432 by instructions stored in a memory 420 included therein and/or by instructions 436 that can be fetched by the processor 432 from a storage medium 438. The storage medium 438 may be co-located with the local computing unit 406 as shown, or it may be located elsewhere and be communicatively coupled to the computing unit 406.

The local computing unit and remote computing unit are comprised of a computing unit 406 which may include one or more hardware and/or software components configured to fetch, decode, execute, store, analyze, distribute, evaluate, diagnose, and/or categorize information. Furthermore, the local computing unit 406 can include an (input/output) I/O module 430 that can be configured to interface with a plurality of remote devices including sensors.

The processor 432 may include one or more processing devices or cores (not shown). In some embodiments, the processor 432 may be a plurality of processors, each having either one or more cores. The processor 432 can be configured to execute instructions fetched from the memory 420, i.e. from one of memory block 422, memory block 424, or memory block 426, or the instructions may be fetched from storage medium 438, or from a remote device connected to the local computing unit 406 via communication interface 434.

Furthermore, without loss of generality, the storage medium 438 and/or the memory 420 may include a volatile or non-volatile, magnetic, semiconductor, tape, optical, removable, non-removable, read-only, random-access, or any type of non-transitory computer-readable computer medium. The storage medium 438 and/or the memory 420 may include programs and/or other information that may be used by the processor 432.

Moreover, the storage medium 438 may be configured to log data processed, recorded, or collected during the operation of the computing unit 406. For example, the storage medium 438 may store historical patterns, predetermined thresholds, for each of the measurable variables associated with one or more electric machines coupled to the local computing unit 406. The data may be time-stamped, location-stamped, cataloged, indexed, or organized in a variety of ways consistent with data storage practice.

In an embodiment, the memory block 428 may be a rotating machine monitoring and diagnostic module. As such, the local diagnostic unit 406 may fetch instructions from these modules, which, when executed by the processor 432, cause the processor 432 to perform certain operations. The operations may include receiving status data from an electric machine coupled to the local diagnostic unit 406.

The operations may further include using the status data to both perform a diagnostics test of the electric machine. The status data may include measured data associated with at least one of voltage, current, temperature, vibration signature, and insulation integrity of the electric machine. The diagnostics test may include comparing the status data with either a historical pattern or a predetermined threshold, or both, based on information stored in the storage medium 438.

Figure 5:
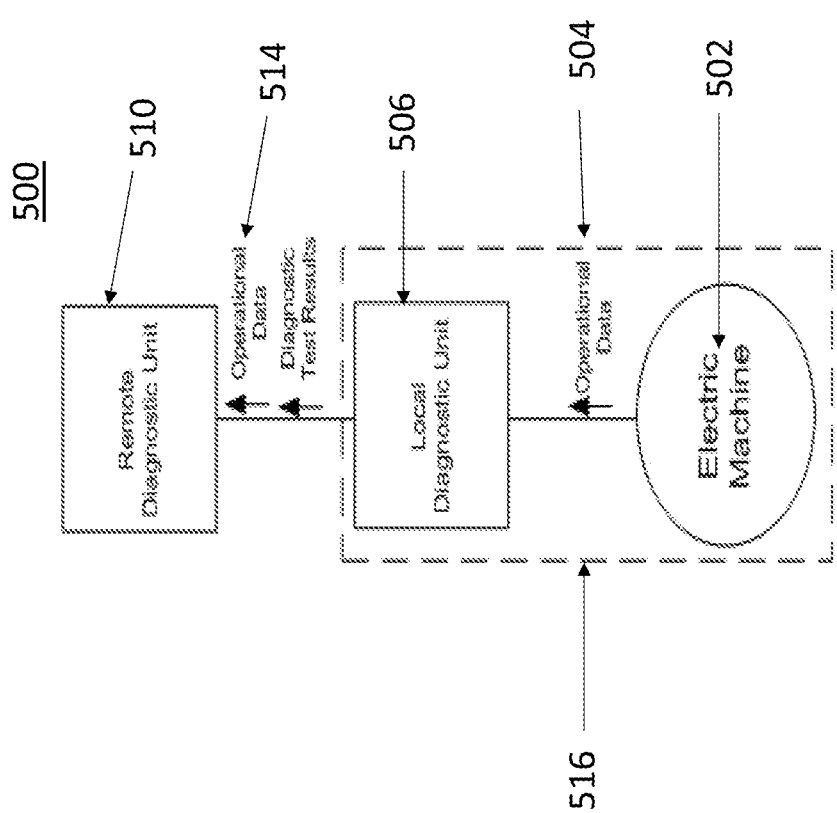
FIG. 5 is a block diagram of health monitoring system in accordance with an embodiment of this disclosure.

FIG. 5 is a block diagram of an embodiment of the disclosure. System 500 illustrates a local group 516. Local group 516 comprises an electric machine 502 that transmits operational data 504 to the local diagnostic unit 506. The local group 516 transmits operational data and diagnostic test results 514 from the local diagnostic unit 506 to the remote diagnostic unit 510.

Figure 6:
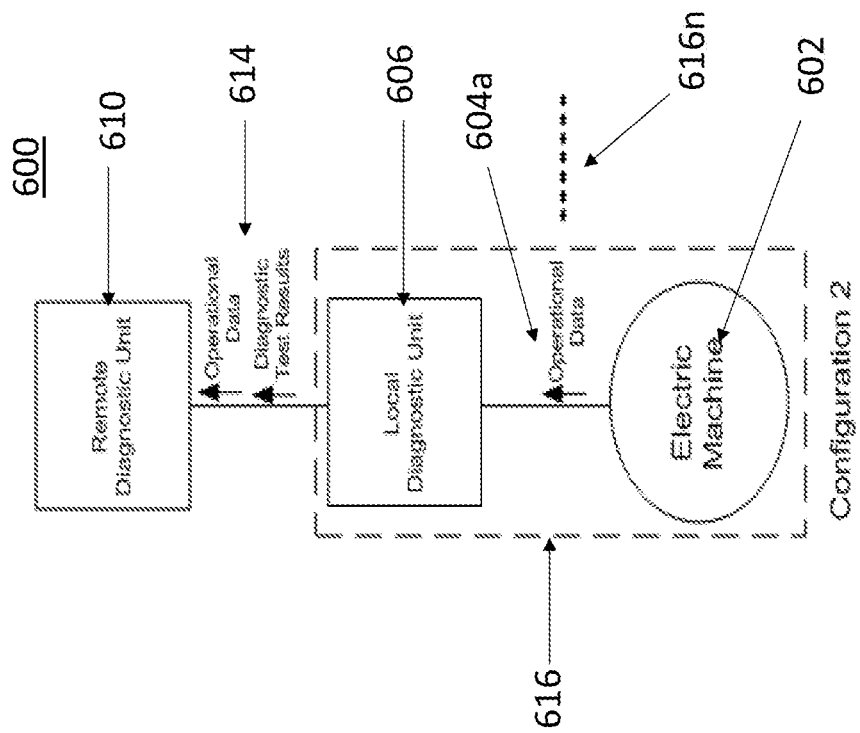
FIG. 6 is a block diagram of a health monitoring system in accordance with an embodiment of this disclosure.

FIG. 6 is a block diagram of an embodiment of the disclosure. System 600 is similar to system 500 of FIG. 5. However, there are more than one units 616*n* of local group 616. The local group 616 comprises electric machine 602 and local diagnostic unit 606, therefore there are more than one of electric machines 602 and local diagnostic units 606. All of the local groups 616 transmit operational data and/or diagnostic test results into one remote diagnostic unit 610. System 600 further comprises transmission of operational data 604*a* from the electric machine 602 to the local computational unit 606. The local diagnostic unit 606 transmits operational data and/or diagnostic test results 614 to the remote diagnostic unit 610.

Figure 7:
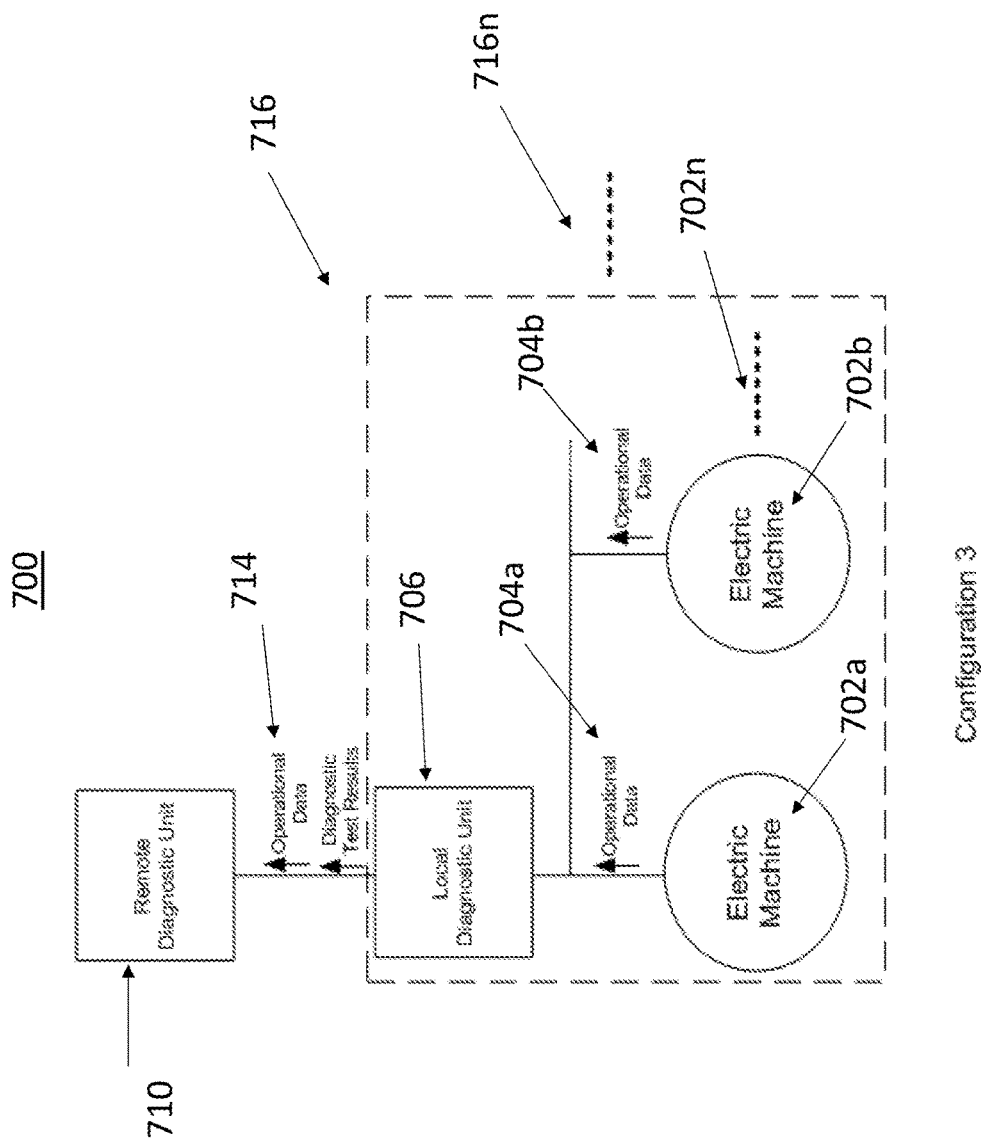
FIG. 7 is a block diagram of a health monitoring system in accordance with an embodiment of this disclosure.

FIG. 7 is a block diagram of an embodiment of the disclosure. System 700 comprises a local group 716. The local group 716 comprises more than one units 702*n* of electric machines 702*a* and 702*b* connected to a single local diagnostic unit 706. There are more than one units 716*n* of local groups 716 connected to a single remote diagnostic unit 710. The local diagnostic unit 706 in each local group 716*n* transmits operational data and/or diagnostic test results 714 to the remote diagnostic unit 710. System 700 further comprises transmission of operational data 704*a* and 704*b* from the electric machines 702*a* and 702*b* to the local computational unit 706.

Figure 8:
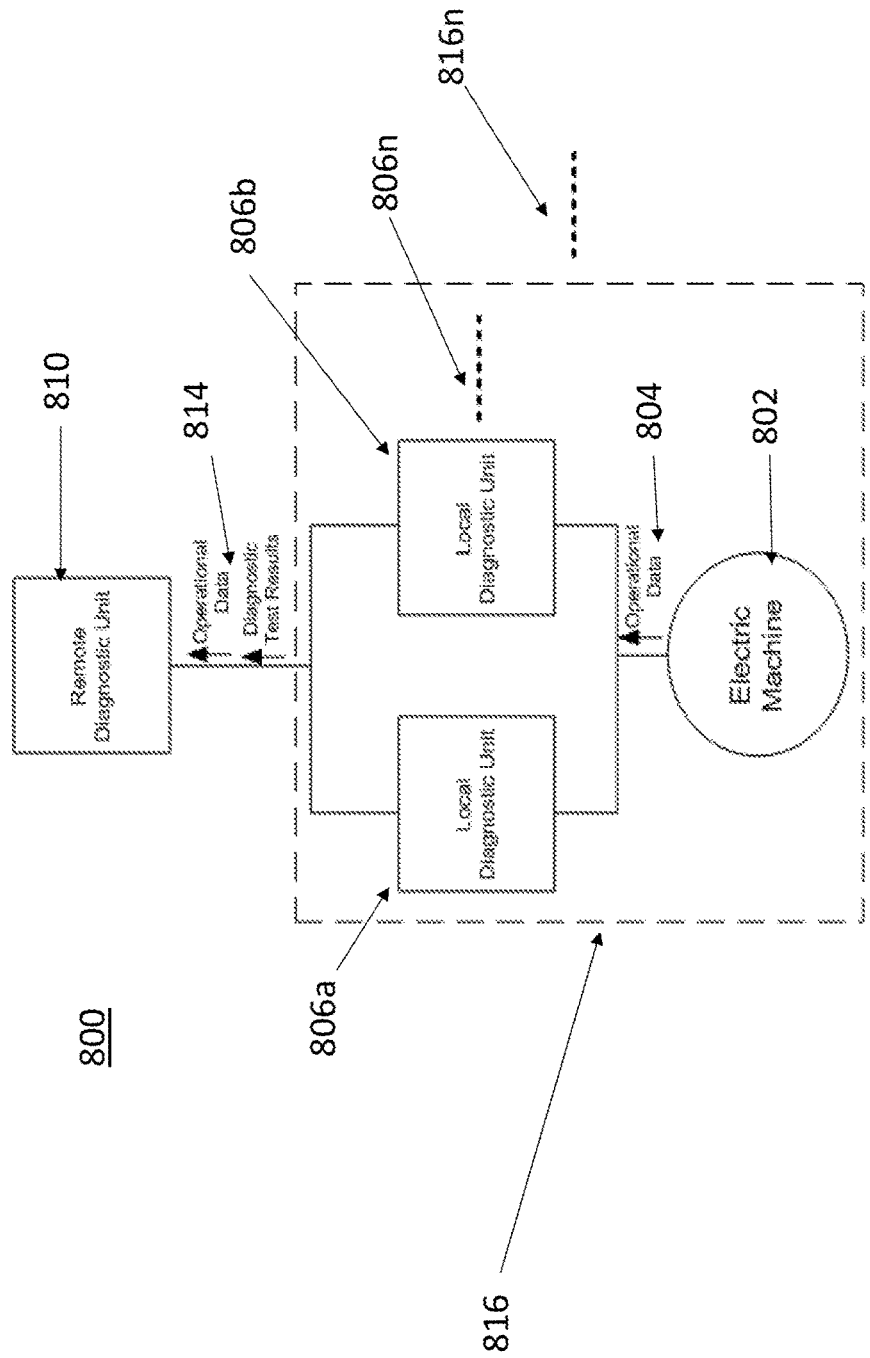
FIG. 8 is a block diagram of a health monitoring system in accordance with an embodiment of this disclosure.

FIG. 8 is a block diagram of an embodiment of the disclosure. System 800 comprises a local group 816. The local group 816 comprises an electric machine 802 that transmits operational data 804 to two local diagnostic units 806*a* and 806*b*. Both local diagnostic units 806*a* and 806*b* transmit operational data and/or diagnostics test results 814 into a remote diagnostic unit 810. In any embodiment, there are more than one units 806*n* of local diagnostic units. Furthermore, there are more than one units 816*n* of local groups 816 attached to the remote diagnostic unit 810.

Figure 9:
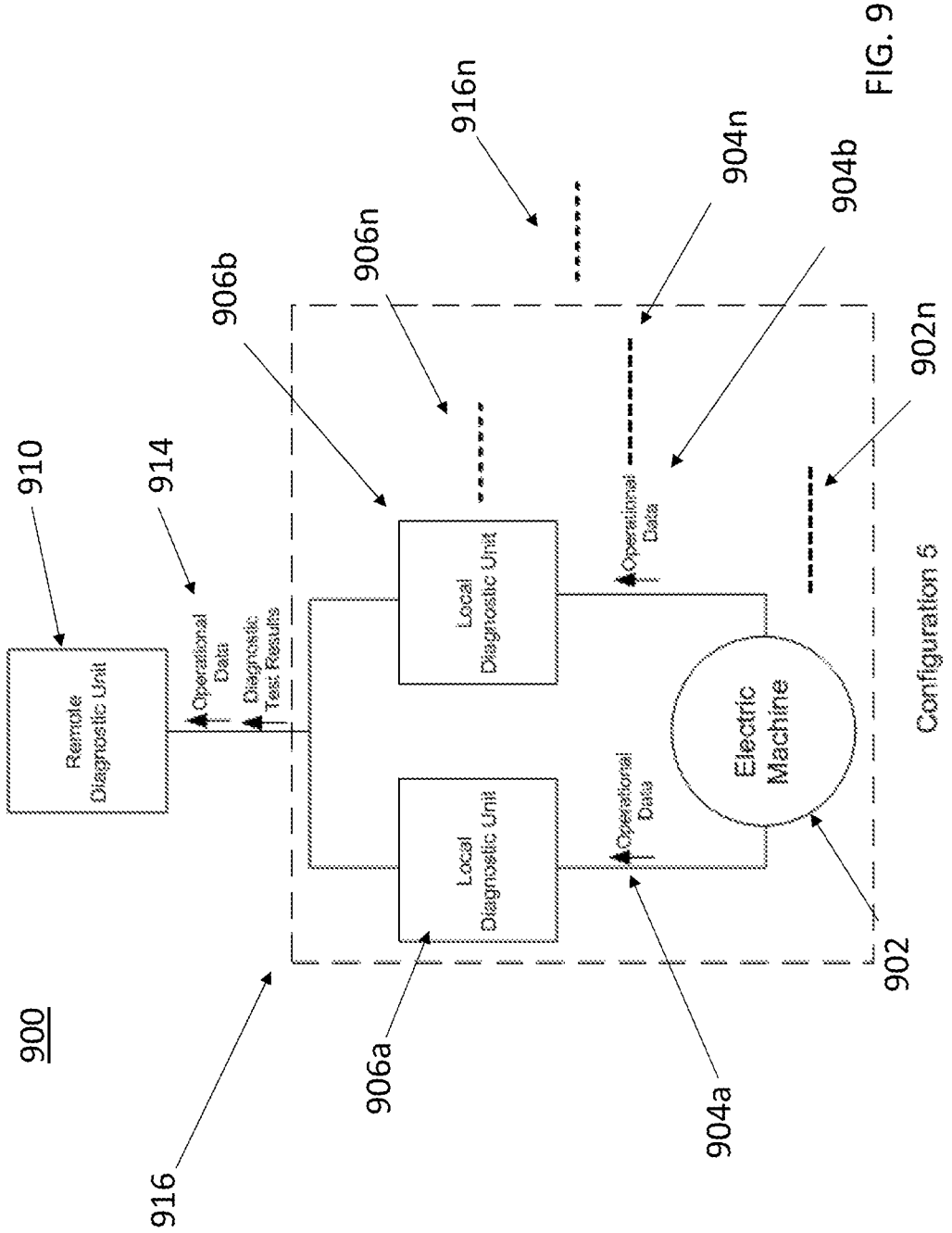
FIG. 9 is a block diagram of a health monitoring system in accordance with an embodiment of this disclosure.

FIG. 9 is a block diagram of an embodiment of the disclosure. System 900 comprises a local group 916. The local group 916 comprises an electric machine 902 that transmits two sets of operational data 904*a* and 904*b* to two different local diagnostic units 906*a* and 906*b*. There are more than one electric machines 902*n* and multiple sets of operational data 904*n*. In certain embodiments, there are more than one unit 906*n* of local diagnostic units. All of the local diagnostic units 906*a*, 906*b*, and/or 906*n* transmits operational data and/or diagnostic test results 914 to a remote diagnostic unit 910. Furthermore, it is possible to have more than one unit 916*n* of local groups 916 that transmit operational data and/or diagnostic test results 914 to the remote diagnostic unit 910.

A plurality of time sequenced operational data, asset performance, and health status indicators are transferred from a local CPU cores 406 to a communications network 130 and then transferred to a remote diagnostic unit 110. A remote diagnostic unit 110 performs additional diagnostic analysis and trends on a plurality of time sequenced operational information based on the asset performance and health status indicators. In an embodiment, more than one rotating machine monitoring and diagnostic unit 428 and local CPU cores 406 may be coupled to the communications network 108 and the remote computing unit 110.

In certain embodiments, an electric machine 102 is coupled to sensor(s). The sensor(s) are located adjacent to an electric machine 102. The sensor(s) are configured to monitor one or more parameters of an electric machine 102, such as current, voltage, vibrations, temperature, etc. The sensor(s) are coupled to a local diagnostic unit 406. Local diagnostic unit 406 includes a data acquisition component and a rotating machine diagnostic algorithms component 428. The data acquisition component acquires data from sensor(s). The data acquisition component also transmits data to the adjacent rotating machine diagnostic algorithms component 428. A transmitter is coupled to a rotating machine diagnostic algorithms components 428. The transmitter is also coupled to a remote diagnostic unit 240. The remote diagnostic unit 110 includes a time sequenced operational data component, a health status indicators component, a remote diagnostic algorithms component 428, and a combined machine health status component 242.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A health monitoring system for an electric machine, comprising:
   a first electric machine;
   a first local diagnostic unit connected with the first electric machine, wherein the first local diagnostic unit includes a local computational unit which is configured to receive a high bandwidth first set of operational data from the first electric machine and perform a first local diagnostic test on the high bandwidth first set of operational data to generate a first local diagnostic test result; and
   a remote diagnostic unit coupled with the first local diagnostic unit, wherein the remote diagnostic unit includes a remote computational unit which is configured to receive the first local diagnostic test result from the first local diagnostic unit, wherein the remote computational unit is further configured to perform a remote diagnostic test using the first local diagnostic test result to obtain an electric machine health status indicator;
   wherein a low bandwidth requirement maintains a data fidelity during a transmission of the first local diagnostic test result from the first electric machine to the remote diagnostic unit.

2. The health monitoring system of claim 1, wherein the first local diagnostic test compares the first set of operational data and the first local diagnostic test results with historical patterns.

3. The health monitoring system of claim 1, wherein the first diagnostic test compares the first set of operational data and the first local diagnostic test results with predetermined thresholds.

4. The health monitoring system of claim 1, wherein the electric machine health status indicator:
   further receives a second set of time-sequenced raw operational data of the first electric machine, and
   compares the second set of time-sequenced raw operational data, the first local diagnostic test results, and the results of the remote diagnostics test with historical patterns.

5. The health monitoring system of claim 1, wherein the electric machine health status indicator compares the first set of operational data, the first local diagnostic test results, and the results of the remote diagnostics test with a predetermined threshold.

6. The health monitoring system of claim 1, further comprising a second electric machine and second local diagnostic unit, the second electric machine is connected to the second diagnostic unit, the second diagnostic unit is connected to the remote diagnostic unit.

7. The health monitoring system of claim 6, wherein the second local diagnostic unit is configured to receive a high bandwidth second set of operational data from the second electric machine and perform a second local diagnostic test on the second set of operational data, wherein the remote diagnostic unit is further configured receive a second local diagnostic test results.

8. The health monitoring system of claim 1, further comprising a second electric machine, wherein the second electric machine is connected to the first local diagnostic unit.

9. The health monitoring system of claim 8, wherein the first local diagnostic unit is further configured to receive a high bandwidth second set of operational data from the second electric machine.

10. The health monitoring system of claim 1, further comprising a second local diagnostic unit, wherein the first electric machine is connected to the second local diagnostic unit, wherein second local computational unit is connected to the remote diagnostic unit.

11. The health monitoring system of claim 10, wherein the second local diagnostic unit is configured to receive the first set of operational data from the first electric machine.

12. The health monitoring system of claim 10, wherein the second local diagnostic unit is configured to receive a second set of operational data from the first electric machine.

13. The health monitoring system of claim 1, wherein:
   the remote diagnostic unit is further configured to receive from at least one of the first local diagnostic unit and the first electric machine a second set of time sequenced raw operational data for the first electric machine; and
   the remote diagnostic unit is configured to perform the remote diagnostic test to obtain the electric machine health status indicator using the first local diagnostic test result and the second set of time sequenced raw operational data.

14. A method for determining performance and health status of an electric machine, comprising:
   acquiring a high bandwidth first operational data set from a first electric machine using a first local diagnostic unit connected with the first electric machine;
   performing a first local diagnostic test on the high bandwidth first operational data set using the first local diagnostic unit to generate a first local diagnostic test result;
   transferring the first local diagnostic tests result generated by the first local diagnostic unit from the first local diagnostic unit to a remote diagnostic unit coupled with the first local diagnostic unit; and
   performing a remote diagnostic test on the first local diagnostic test result using the remote diagnostic unit;
   wherein a low bandwidth requirement maintains a data fidelity during a transmission of the first local diagnostic test result from the first electric machine to the remote diagnostic unit.

15. The method of claim 14, further comprising performing at the first local diagnostic unit an expert diagnostic test using at least one of the first operational data set, the first diagnostic test result, and a remote diagnostic test results by an electric machine expert.

16. The method of claim 14, further comprising reporting health status indicators to end users.

17. The method of claim 14, further comprising acquiring a second operational data set from a second electric machine using the first local diagnostic unit.

18. The method of claim 14, furthering comprising acquiring the first operational data set from the first electric machine using a second local diagnostic unit.

19. The method of claim 14, further comprising acquiring a second operational data set from the first electric machine using a second local diagnostic unit.

20. The method of claim 14, further comprising:
   receiving at the remote diagnostic unit from at least one of the first local diagnostic unit and the first electric machine a second set of time sequenced raw operational data for the first electric machine; and
   performing at the remote diagnostic unit the remote diagnostic test to obtain the electric machine health status indicator using the first local diagnostic test result and the second set of time sequenced raw operational data.

\* \* \* \* \*